United States Patent [19]

Cederberg

[11] Patent Number: 5,151,145
[45] Date of Patent: Sep. 29, 1992

[54] LINER/MANDREL FOR FILAMENT WOUND VESSELS

[76] Inventor: Alvin R. Cederberg, 2823 N. 74th St., Lincoln, Nebr. 68507

[21] Appl. No.: 456,589

[22] Filed: Jan. 2, 1990

Related U.S. Application Data

[63] Continuation of Ser. No. 811,633, Dec. 20, 1985, abandoned.

[51] Int. Cl.⁵ .............................................. B32B 5/00
[52] U.S. Cl. ....................................... 156/172; 60/255
[58] Field of Search .................... 60/253, 255, 409; 156/172; 220/414

[56] References Cited

U.S. PATENT DOCUMENTS

| | | | |
|---|---|---|---|
| 2,061,604 | 11/1936 | Winterbauer | 156/172 |
| 2,479,828 | 8/1949 | Geckler | 150/172 |
| 3,031,099 | 4/1962 | Wiltshire | 220/414 |
| 3,290,197 | 12/1966 | Carmody | 60/253 |
| 3,293,860 | 12/1966 | Stedfield | 60/253 |
| 3,296,802 | 1/1967 | Williams | 60/253 |
| 3,303,079 | 2/1967 | Carter | 156/172 |
| 3,357,594 | 12/1967 | Grosh et al. | 220/414 |
| 3,535,179 | 10/1970 | Dryden | 156/172 |
| 3,745,927 | 7/1973 | Tanner et al. | 156/172 |
| 3,874,544 | 4/1975 | Harmon | 220/144 |
| 4,530,379 | 7/1985 | Policelli | 220/414 |
| 4,552,281 | 11/1985 | Schneider | 220/414 |

FOREIGN PATENT DOCUMENTS

| | | | |
|---|---|---|---|
| 63803 | 10/1955 | France | 156/172 |
| 552437 | 4/1943 | United Kingdom | 156/172 |
| 2039980 | 8/1980 | United Kingdom | 220/414 |

*Primary Examiner*—Louis J. Casaregola
*Assistant Examiner*—Timothy S. Thorpe

[57] ABSTRACT

A liner for a rocket motor case or other filament wound vessel includes a relatively thin casing. Reinforcements are formed integrally with the interior of the casing whereby the liner can be used as a mandrel for filament winding or applying composite material to the rocket motor case or other vessel. Interfacing is formed integrally with the interior of the casing for positioning and restraining propellant, hardware or other components within the liner.

6 Claims, 1 Drawing Sheet

LINER/MANDREL FOR FILAMENT WOUND VESSELS

This application is a continuation of application Ser. No. 811,633, filed Dec. 20, 1985 now abandoned.

BACKGROUND OF THE INVENTION

This invention relates to filament wound vessels and, more particularly, to a liner for a rocket motor case or other filament wound or composite vessel.

Conventionally, filament wound vessels are fabricated of a winding composite which may or may not include a liner. The liner and/or filament wound composite is laid-up over a mandrel in a variety of winding patterns into the desired shape of the vessel. In some instances, a liner must be provided for reinforcement or for providing a barrier between the filament wound composite and the contents of the vessel. In other instances, various hardware or other components are mounted in or secured inside of the vessel.

Specifically, a mandrel is provided as the means for filament winding or applying composite material in a desired shape or configuration. A liner provides a protective barrier or isolates the contents of the vessel from the external environment. The liner also prevents leakage of pressurized gas or liquid into or through the composite reinforcement. Separate structures or mounting means are provided within the liner or the composite for positioning, restraining or attaching various interior components of the vessel.

For instance, in the art of rocket motor cases, a liner isolates propellant within the vessel from the environment and prevents leakage of hostile gases or liquids into the vessel and possible contamination or adverse affects on the propellant. Separate interior structural components are used to position, restrain or attach the propellant or inert hardware inside the vessel. An ignitor/nozzle assembly also is incorporated with such rocket motor cases. Because of the complicated nature of such vessels, resort often is made to simply providing metal cases for the propellant, hardware and other components. This creates weight problems and greatly increases the costs of the item.

This invention is directed to solving the problems in the dilemma described above, by providing a liner for a rocket motor case or other filament wound vessel which also can be used as a mandrel for filament winding the vessel, in addition to integral interface means for positioning and restraining propellant, hardware or other components within the liner.

SUMMARY OF THE INVENTION

An object, therefore, of this invention is to provide a novel liner for a filament wound vessel which is used both as a mandrel for filament winding the vessel as well as the mounting means itself for interior components of the vessel.

In the exemplary embodiment of the invention, a liner is provided for a rocket motor case or other filament wound vessel. It immediately should be understood that the disclosure herein of a rocket motor case is not intended to limit the invention, and that the novel concepts of the invention are equally applicable for a wide range of applications.

Generally, the liner is formed with a relatively thin casing. Reinforcing means are formed integrally with the interior of the casing whereby the liner can be used as a mandrel for filament winding the rocket motor case or other vessel. Interface means are formed integrally with the interior of the casing for positioning and restraining propellant, hardware or other components within the liner. The reinforcing means include rib means formed integrally with the inside surface of the casing. The casing is fabricated of plastic or like moldable material. The interface means can be formed in a wide variety of configurations, including spaced means for positioning and restraining the ends of solid propellant sticks.

The casing is fabricated in halves mating at a perimetral joint, and a feature of the invention includes a splice ring at the joint. The splice ring is generally cross-shaped in cross-section, with one leg of the cross centered between the two mating halves of the casing and the two legs of the cross normal to the one leg in abutting relationship with the inside surfaces of the mating halves along the joint.

A filament wound composite therefore can be wound about the casing as the reinforcing means enables the casing to comprise a mandrel. The integral interface means eliminates all extraneous mounting hardware for the solid propellant, for instance. An opening is provided in at least one of the mating halves of the casing for receiving and positioning nozzle means and/or ignitor means for the rocket motor case.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE PREFERRED EMBODIMENT

Figure 1:
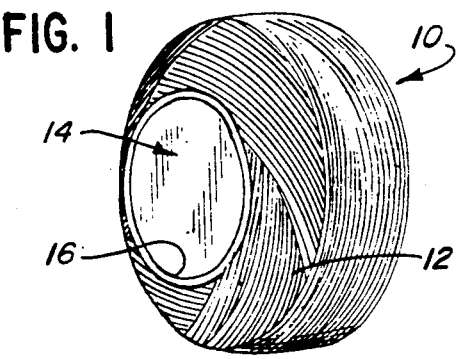
FIG. 1 is a perspective view of a finished filament wound rocket motor case fabricated with the novel liner/mandrel of the invention.

Referring to the drawings in greater detail, and first to FIG. 1, the invention is disclosed herein for use as a liner/mandrel for a rocket motor, generally designated 10, which includes an outer thickness 12 of a filament wound composite. FIG. 1 shows an end of an ignitor/nozzle assembly, generally designated 14, exposed through an opening 16 in the filament wound vessel.

Figure 2:
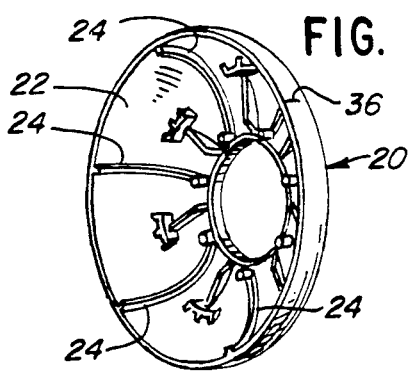
FIG. 2 is a perspective view looking toward the interior of one of the mating halves of the liner/mandrel.
Figure 3:
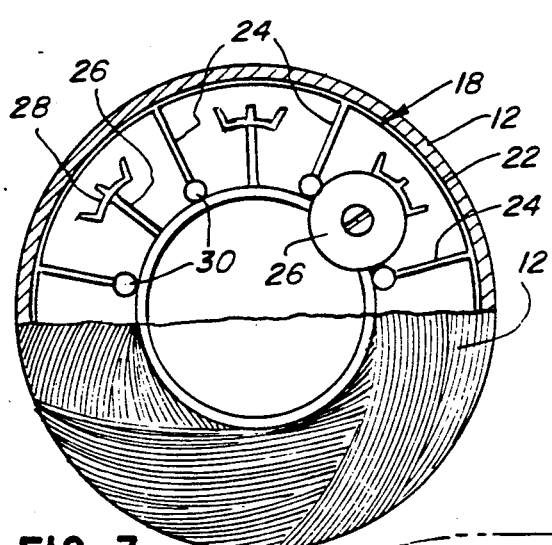
FIG. 3 is a plan view illustrating on one-half the completed vessel, with a section through the other half and illustrating a propellant stick in position within the case.
Figure 4:
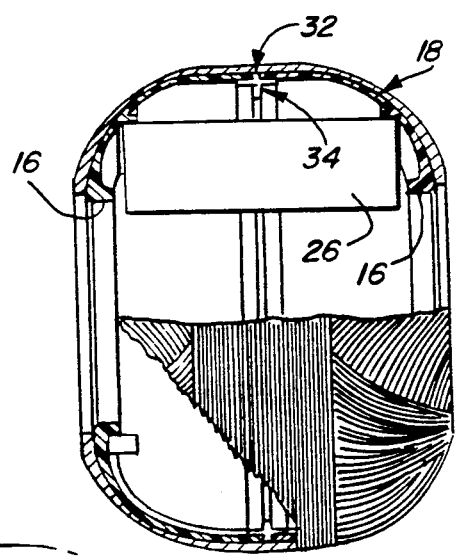
FIG. 4 is a view similar to that of FIG. 3, but illustrating a side elevation of the case.

FIGS. 2-4 show in details the liner/mandrel of this invention. For purposes of brevity, the term "liner" will be used hereinafter. The liner, generally designated 18, is fabricated of identical mating halves, as generally indicated 20 in FIG. 2. Each half, and therefore the assembled liner, includes a relatively thin casing 22 fabricated of plastic or like material. Such material is preferred because it can be molded to form the integral reinforcing means and interface means described below.

More specifically, the reinforcing means is shown in the form of meridian ribs 24 formed integrally with the interior of casing 22. Such reinforcing means thereby allows the liner to serve as a mandrel for filament winding or other means of applying composite material over the liner. To this end, it should be understood that the terms "filament winding" or "filament wound" vessel herein and in the claims hereof are intended in their broadest sense to include not only the winding of separate filaments or roving of filaments to build up a composite material, but also to include other methods of laying up a composite thickness about the liner of this invention. Of course, other reinforcing means than ribs 24 are contemplated by integrally forming the reinforcing means with the liner.

The interface means is illustrated herein as including spaced means for positioning and restraining the ends of solid propellant sticks 26 (FIGS. 3 and 4). Specifically, flat ledges 26, arcuate braces 28 and spacer posts 30 are molded integrally with the interior of casing 22, specifically the inner surface thereof, for positioning and restraining solid propellant sticks 26 within liner 18 when the mating halves 20 are assembled. Sets of ledges 26, braces 28 and adjacent spacer posts 30 are provided to position seven solid propellant sticks within the particular rocket motor case shown. Again, it should be understood that a wide variety of such interface means can be molded integrally with the interior of the liner to accommodate a variety of propellant components or other hardware for the rocket motor case or other vessel.

Liner 20 (i.e. casing 22) is fabricated of identical halves mating at a perimetral joint, generally designated 32 in FIG. 4. Each half includes the reinforcing means and interface means described above, and a single mating half is illustrated best in FIG. 2.

A splice ring, generally designated 34 in FIG. 4, is provided at joint 32 when the mating halves are assembled. It can be seen in FIG. 4 that splice ring 34 is generally cross-shaped in cross-section. One leg of the cross is centered between the perimetral edges of the mating halves. The two legs of the cross normal to said one leg abut against the inside surfaces of the mating halves along the joint. These two legs of the cross parallel to the axis of the rocket motor case are bonded to the inner surfaces of the liner halves. The segments of the cross normal to the axis provide increased diametral stiffness for both the splice ring and the bonded assembly. Rotational orientation of one liner half with respect to the other in order to align the reinforcing means and interface means, described above, can be obtained by visual alignment of index marks 36 (FIG. 2) molded into the external surface of the liner halves. As with the other integral components of the liner, this again minimizes requirements for special tooling or hardware. The joining and sealing of the liner halves with the splice ring can be accomplished by bonding with adhesives.

After the halves are joined and sealed, filament winding or other composite material 12 is wound about or applied to the outside of the liner as the liner acts as its own mandrel or other means for applying the composite.

Figure 5:
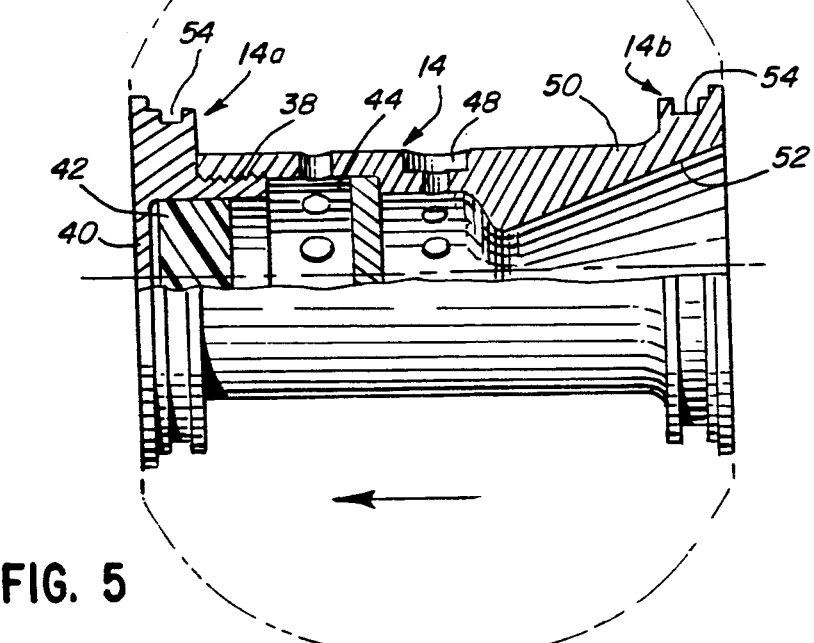
FIG. 5 is a fragmented view of an ignitor/nozzle assembly for use with the rocket motor case which is shown in phantom.

FIG. 5 shows ignitor/nozzle assembly 14 which can be of conventional configuration. The primary elements of the assembly are an ignitor, generally designated 14a, in the forward section and a submerged nozzle, generally designated 14b, in the aft section of the rocket motor case. The two major components are inserted from opposite ends of the motor case and are threaded together, as at 38. The assembly includes an ignitor closure 40, an ignitor squib 42, an ignitor chamber 44, and ignitor exit holes 46. The submerged nozzle includes nozzle entrance holes 48 in a nozzle body 50 defining a recessed nozzle exit cone 52. Grooves 54 are provided about ignitor 14a and nozzle 14b for receiving O-rings (not shown) for sealing with the liner.

During assembly, solid propellant sticks 26 first are positioned through openings 16 in the filament wound liner and partially restrained as described above. The ignitor and nozzle sections then are inserted and threaded together, with the radially inner sides of the solid propellant sticks abutting against the outside cylindrical surface area of the ignitor/nozzle assembly. The ignitor is electrically activated and combustion products are blown out through holes 46 onto the propellant sticks surrounding the ignitor/nozzle assembly. Gas produced by combustion of the propellant sticks flow through holes 48 in the nozzle body and out through exit cone 52 to generate thrust.

From the foregoing, it can be seen that the novel liner/mandrel 18 of this invention (1) serves as a mandrel for filament winding or other means of applying composite material over the liner, (2) serves as a protective barrier, isolating the contents of the vessel such as the propellant from the external environment, (3) serves as a liner preventing leakage of pressurized gas or liquid into or through the composite reinforcement, (4) provides integral interfaces and/or structure at openings for assembly with other hardware such as an ignitor/nozzle assembly, and (5) provides integral internal interfaces for positioning, restraining or attaching other components such as solid propellant or inert hardware. The invention solves the problem of providing a small, lightweight and low cost vessel while still providing all of the above features. The process of manufacture and assembly are equally simple and low cost.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A liner for a filament wound vessel, comprising a thin casing fabricated of halves mating at a perimetral joint, reinforcing means formed integrally with the interior of the casing whereby the liner can be used as a mandrel for filament winding or applying composite material to the vessel and a splice ring at said joint, the splice ring being generally cross-shaped in diametral-section, with one leg of the cross centered between the two mating halves of the casing and the two legs of the cross normal to said one leg abutting the inside surfaces of the mating halves along the joint.

2. The liner of claim 1 wherein said casing is fabricated of plastic material.

3. The liner of claim 1, including a filament wound composite about said casing.

4. A liner for a filament wound vessel, comprising:

a thin casing fabricated of halves mating at a perimetral joint; and a splice ring at said joint, said splice ring being generally cross-shaped in diametral section, with one leg of the cross centered between the two mating halves of the casing and the two legs of the cross normal to said one leg abutting the inside surfaces of the mating halves along the joint.

5. The liner of claims 4 wherein said casing is fabricated of plastic material.

6. The liner of claim 4, including a filament wound composite about said casing.

* * * * *

UNITED STATES PATENT AND TRADEMARK OFFICE
CERTIFICATE OF CORRECTION

PATENT NO. : 5,151,145

DATED : September 29, 1992

INVENTOR(S) : Alvin R. Cedarberg

It is certified that error appears in the above-identified patent and that said Letters Patent is hereby corrected as shown below:

On title page, item [73], add
    Assignee:  Brunswick Corporation
                 Skokie, IL Signed and Sealed this Fourteenth Day of September, 1993

Attest:

BRUCE LEHMAN

Attesting Officer    Commissioner of Patents and Trademarks